United States Patent  
Muhanna et al.

(10) Patent No.: US 8,576,796 B2
(45) Date of Patent: *Nov. 5, 2013

(54) SUPPORT FOR MULTI-HOMING PROTOCOLS

(75) Inventors: Ahmad Muhanna, Richardson, TX (US); Mohamed Khalil, Murphy, TX (US); Khosrow Saboorian, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 325 days.

This patent is subject to a terminal disclaimer.

(21) Appl. No.: 12/681,358

(22) PCT Filed: Oct. 9, 2008

(86) PCT No.: PCT/US2008/011602

§ 371 (c)(1),
(2), (4) Date: Apr. 1, 2010

(87) PCT Pub. No.: WO2009/048583

PCT Pub. Date: Apr. 16, 2009

(65) Prior Publication Data

US 2010/0272061 A1    Oct. 28, 2010

Related U.S. Application Data

(60) Provisional application No. 60/979,414, filed on Oct. 12, 2007, provisional application No. 60/978,821, filed on Oct. 10, 2007.

(51) Int. Cl.
*H04W 4/00* (2009.01)

(52) U.S. Cl.
USPC ............................................. 370/331

(58) Field of Classification Search
USPC ............. 370/310, 328–311; 455/403, 422.1, 455/436–444
See application file for complete search history.

(56) References Cited

U.S. PATENT DOCUMENTS 7,139,833 B2    11/2006 Heller
2005/0128969 A1    6/2005 Lee et al.
(Continued)

FOREIGN PATENT DOCUMENTS

| JP | 200533374 | 3/2005 |
| WO | 2006/111938 | 10/2006 |
| WO | 2006/130058 | 12/2006 |
| WO | 2007039007 | 4/2007 |

OTHER PUBLICATIONS

Office Action issued in Chinese Application No. 200880110852.9 on Jul. 3, 2012; 14 pages.

(Continued)

*Primary Examiner* — Charles C Jiang
(74) *Attorney, Agent, or Firm* — Fish & Richardson P.C.

(57) ABSTRACT

The present invention solves these problems with a new proxy binding update request and proxy binding acknowledgment messages having new indicators and identification information. Namely, the home agent/local mobility anchor will exchange proxy binding update messages and proxy binding acknowledge messages that include information such as mobile node identification (MN-ID), home network prefix (HNP), but can also include selective information fields such as, access type, handover indicator (HO), and interface identification (interface ID) By including new access type, indicator, and identification information, the local mobility anchor can respond to a binding update request message with a better understanding of the new connectivity request from the mobile node.

20 Claims, 2 Drawing Sheets

(56) References Cited

U.S. PATENT DOCUMENTS

| | | | |
|---|---|---|---|
| 2006/0251044 A1 | 11/2006 | Haddad | |
| 2007/0002787 A1 | 1/2007 | Narayanan et al. | |
| 2008/0207168 A1* | 8/2008 | Forsberg | 455/411 |
| 2009/0094693 A1* | 4/2009 | Patil | 726/12 |
| 2011/0007711 A1 | 1/2011 | Muhanna | |

OTHER PUBLICATIONS

International Search Report and Written Opinion of the International Searching Authority issued in International Application No. PCT/US2008/011602 on Dec. 9, 2008; 6 pages.

International Preliminary Report on Patentability issued in International Application No. PCT/US2008/011602 on Apr. 13, 2010; 6 pages.

International Searching Authority: Notification of Transmittal of the International Search Report, Written Opinion of Int'l Searching Authority, or the Declaration in international application No. PCT/US2009/001738, dated Jun. 4, 2009.

International Searching Authority: Written Opinion of the International Searching Authority in international application No. PCT/US2009/001738, dated Jun. 4, 2009.

International Searching Authority: International Search Report in international application No. PCT/US2009/001738, dated Jun. 4, 2009.

File history of U.S. Appl. No. 12/922,933.

Notice of Allowance issued in Chinese Application No. 200880110852.9 on Dec. 5, 2012; 5 pages.

Office Action issued in Japanese Application No. 2010-528882 on Mar. 11, 2013; 5 pages.

* cited by examiner

SUPPORT FOR MULTI-HOMING PROTOCOLS

RELATED APPLICATION DATA

This application is related to Provisional Patent Application Ser. Nos. 60/978,821 filed on Oct. 10, 2007 and 60/979,414 filed on Oct. 12, 2007, and priority is claimed for this earlier filing under 35 U.S.C. §119(e). The Provisional Patent Application is also incorporated by reference into this utility patent application.

TECHNICAL FIELD OF THE INVENTION

A method for allocating addressing for a mobile node on a communication system using a handover indicator, access type indicator, and other identification fields.

BACKGROUND OF THE INVENTION

IP-based mobile systems provide for communication between at least one mobile node and a wireless communication network. The term "mobile node" includes a mobile communication unit (e.g., mobile terminal, "smart phones", nomadic devices such as laptop PCs with wireless connectivity, as described in greater detail below). Among other elements, the wireless communication system includes a home network and a foreign network. The mobile node may change its point of attachment to the Internet through these networks, but the mobile node will always be associated with a single home network for IP addressing purposes. The home network includes a home agent and the foreign network includes a foreign agent—both of which control the routing of information packets into and out of their network.

The mobile node, home agent and foreign agent may be called different names depending on the nomenclature used on any particular network configuration or communication system. For instance, a "mobile node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. Mobile nodes are sometimes called a user equipment, mobile unit, mobile terminal, mobile device, or similar names depending on the nomenclature adopted by particular system providers. Generally, there is also a correspondence node, which may be mobile or fixed, that may be located on the network for communicating with the mobile node.

A home agent may also be referred to as a Local Mobility Anchor, Home Mobility Manager, Home Location Register, and a foreign agent may be referred to as a Mobile Access Gateway, Serving Mobility Manager, Visited Location Register, and Visiting Serving Entity. The terms mobile node, home agent and foreign agent are not meant to be restrictively defined, but could include other mobile communication units or supervisory routing devices located on the home or foreign networks. Foreign networks can also be called serving networks.

Registering the Mobile Node

Foreign agents and home agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a home agent, a foreign agent, etc.) to a mobile node. Mobile nodes examine the agent advertisement and determine whether they are connected to the home network or a foreign network.

The mobile node will always be associated with its home network and sub-network for IP addressing purposes and will have information routed to it by routers located on the home and foreign network. If the mobile node is located on its home network, information packets will be routed to the mobile node according to the standard addressing and routing scheme. If the mobile node is visiting a foreign network, however, the mobile node obtains appropriate information from the agent advertisement, and transmits a registration request message (sometimes called a binding update request) to its home agent through the foreign agent. The registration request message will include a care-of address for the mobile node. A registration reply message (also called a binding update acknowledge message) may be sent to the mobile node by the home agent to confirm that the registration process has been successfully completed.

The mobile node keeps the home agent informed as to its location on foreign networks by registering a "care-of address" with the home agent. The registered care-of address identifies the foreign network where the mobile node is located, and the home agent uses this registered care-of address to forward information packets to the foreign network for subsequent transfer onto the mobile node. If the home agent receives an information packet addressed to the mobile node while the mobile node is located on a foreign network, the home agent will transmit the information packet to the mobile node's current location on the foreign network using the applicable care-of address. That is, this information packet containing the care-of address will then be forwarded and routed to the mobile node on the foreign network by a router on the foreign network according to the care-of address.

When mobile nodes move from one foreign network to another foreign network, problems are sometimes encountered with the registration of the care of addressing with the home agent or local mobility anchor. Further, multiple interfaces may be supported on a single or multiple foreign networks, which can include the different communication access types 802.11d, 802.11g, FIRM, WiFi, WiMax, CDMA, or LTE. Problems can be encountered when the mobile node becomes coupled to different access types on a single or multiple networks. Thus, it is a primary objective of this invention to provide addressing support for a mobile node where there is a handover to a new foreign network, a handover to a second access type on the same foreign network (multiple access types are supported on the foreign network), and/or multiple interfaces are supported for connecting a mobile node to a foreign network.

SUMMARY OF THE INVENTION

The present invention solves these problems with a new proxy binding update request and proxy binding acknowledgement messages having new indicators and identification information. Namely, the home agent/local mobility anchor will exchange proxy binding update messages and proxy binding acknowledge messages that include information such as mobile node identification (MN-ID), home network prefix (HNP), but can also include selective information fields such as, access type, handover indicator (HO), and interface identification (interface ID). By including new access type, indicator, and identification information, the local mobility anchor can respond to a binding update request message with a better understanding of the new connectivity request from the mobile node. The proxy binding update request and acknowledgement messages may require new fields or expanded fields for the transmission of the additional information, and the local mobility anchor/home agent will also need to expand its binding cache entry table to support these new information fields. The invention can be implemented using a new protocol application or modified messages from prior registration applications.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like element.

DETAILED DESCRIPTION OF THE PREFERRED EMBODIMENTS

Figures 1, 2:
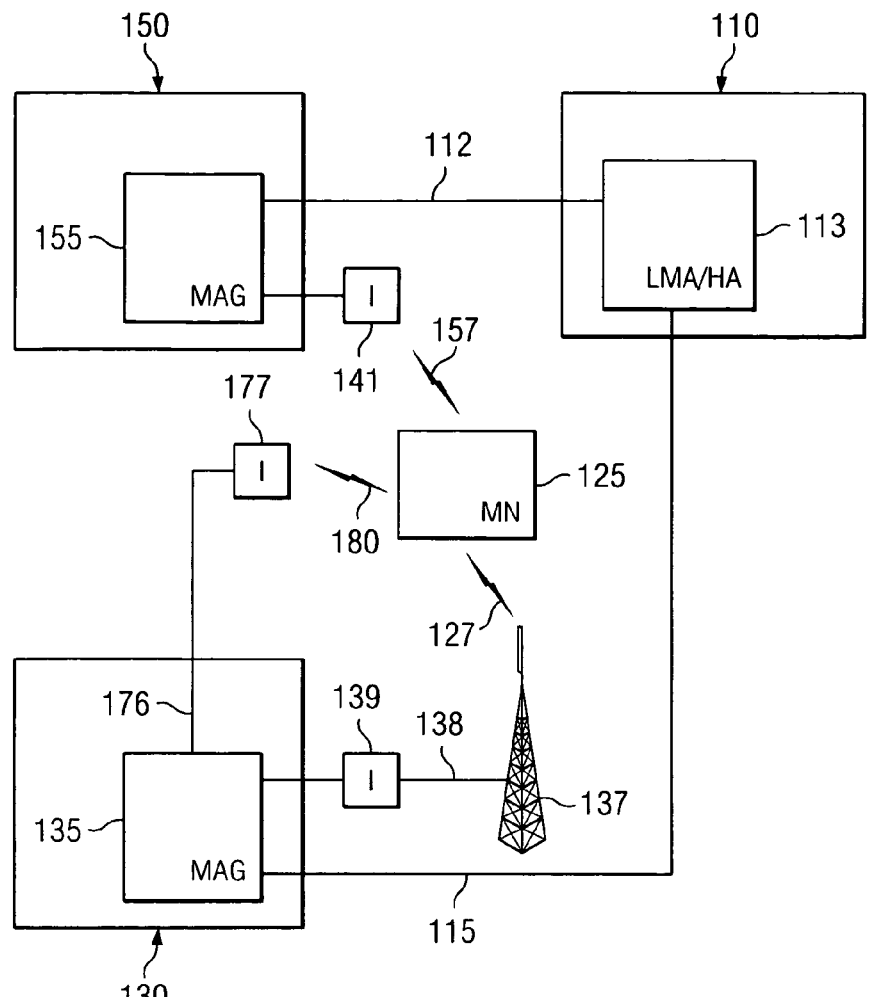
FIG. 1 is a mobile IP-based communication system as used in the present invention using proxy messages that specify access type fields.
FIG. 2 is a binding cache entry table that supports these entries for the system shown in FIG. 1.

In FIG. 1, the overall architecture of the IP-based mobile system is shown with a mobile mode 125, a home network 110 and foreign networks 130 and 150, respectively. As shown in FIG. 1, the home network 110 has a home agent or local mobility anchor 113. The local mobility anchor 113 is coupled to the mobility agent gateway 155 on foreign network 150 by communication link 112, and local mobility anchor 113 is coupled to the mobility agent gateway 135 on foreign network 130 by communication link 115.

The mobility agent gateway 135 is coupled to the mobile node 125 through the radio access system comprised of the base station transceiver 139 coupled to the antenna/transmitter 137 through the wireless communication link 127. The mobility agent gateway 155 is coupled the mobile node 125 using a second communication access type, such as WiMax or WiFi, which is supported by the interface 141 and wireless communication link 157. FIG. 1 also shows a connection to mobile node 125 from the foreign agent 135 through connection 176 and second access interface 177. This interface is connected to mobile node 125 through wireless communication link 180. In this embodiment, the communication access type supported by connection interface 177 is the same as the second communication access type supported by interface 141. This embodiment has a limitation that multiple interfaces may be supported on the networks, but on any given foreign network (such as network 150 or 130), only one interface will be supported for each communication access type.

Mobile node 125 is shown electronically coupled to the foreign networks 150 and 130 via the wireless communication link 157 and 127, respectively. The mobile node 125, however, can communicate with any transceiver or access network coupled to a foreign network. That is, communications links 127 and 157 are radio transmitted links, but these links can be composed of any connection between two or more nodes on a network or users on networks or administrative domains.

The terms Local Mobility Anchor, home agent, and foreign agent may be as defined in the Mobile IP Protocol (RFC 2002), but these agents are not restricted to a single protocol or system. In fact, the term home agent, as used in this application, can refer to a home mobility manager, home location register, home serving entity, or any other agent at a home network 110 having the responsibility to manage mobility-related functionality for a mobile node 125. Likewise, the term mobility agent gateway, as used in this application, can refer to a foreign agent, serving mobility manager, visited location register, visiting serving entity, or any other agent on a foreign network having the responsibility to manage mobility-related functionality for a mobile node 125.

In the mobile IP communications system shown in FIG. 1, the mobile node 125 is identified by a permanent IP address. While the mobile node 125 is coupled to its home network 110, the mobile node 125 receives information packets like any other fixed node on the home network 110. When mobile, the mobile node 125 can also locate itself on foreign network, such as network 130 or 150. When located on foreign network 130 or 150, the home network 110 sends data communications to the mobile node 125 by "tunneling" the communications to the foreign network 130 or 150.

The mobile node 125 keeps the local mobility anchor 113 informed of its current location, or foreign network association, by registering a care-of address with the local mobility anchor 113. Essentially, the care-of address represents the foreign network where the mobile node 125 is currently located. If the local mobility anchor 113 receives an information packet addressed to the mobile node 125 while the mobile node 125 is located on a foreign network 130, the local mobility anchor 113 will "tunnel" the information packet to foreign network 130 for subsequent transmission to mobile node 125.

The foreign agent 135 participates in informing the local mobility anchor 113 of the mobile node 125 current care-of address. The foreign agent 135 also receives information packets for the mobile node 125 after the information packets have been forwarded to the foreign agent 135 by the local mobility anchor 113. Moreover, the foreign agent 135 serves as a default router for out-going information packets generated by the mobile node 125 while connected to the foreign network 130.

The mobile node 125 participates in informing the local mobility anchor 125 of its current location and requests connections to the associated foreign network. When the mobile node 125 transitions to connecting to a different access type on the foreign network or a wholly different foreign network (handover), the mobile node 125 obtains appropriate information regarding the address of the foreign network and/or the foreign agent from an agent advertisement.

When first connected to the local mobility anchor 113, mobile node 125 would have created an entry on the binding cache entry table in FIG. 2 that specified the mobile node identification for the mobile node 125. The access type field of information is included in the proxy binding update request and the binding cache entry table in FIG. 2, with the mobile node identification field. FIG. 2 is a binding cache entry table 160 that possesses at least column and row entries for the mobile node identification 165 and the access type 167. Other fields are maintained on the binding cache entry table, but these are the pertinent entries for the consideration of the present invention.

Because each access type on the networks shown on FIG. 1 are limited to a single interface from each foreign network, the local mobility anchor will check subsequent proxy binding update requests received from the mobile node 125 to determine if this proxy binding update request has the same access type indicator as previously maintained on the binding cache entry table 160 for that mobile node 125. If the same access type indicator is found in a proxy binding update request as previously maintained on the binding cache entry table 160 for that mobile node 125, the local mobility anchor 113 will recognize the situation as a handover of the mobile node 125 to a new foreign network, such as a handover of mobile node 125 from foreign network 130 to foreign network 150. The local mobility anchor 113 will create a new binding cache entry for the mobile node, and the care-of addressing and home network prefix will be changed to designate the new foreign network as the network where the mobile node 125 can be located, which information will be transmitted to the proper mobility access gateway 135 and the mobile node 125.

If the comparison with the information in the proxy binding update request shows a different access type connection for the mobile node 125, the local mobility anchor will determine if the home network prefix should designate the foreign network where the mobile node 125 was previously located without any indication of a handover to a new foreign network. If that is the case, the entry for the mobile node 125 will be modified on the binding cache entry table to indicate that the mobile node 125 is still connected to the first foreign network 130, which information will be transmitted to the proper mobility access gateway 135 and the mobile node 125.

That is, this comparison may simple show the new connection for the mobile node 125 is to a new access type, as opposed to a handover to a new foreign network. If so, the local mobility anchor 113 will respond to the proxy binding update request with a proxy binding update response having a home network prefix indicator that points to the first foreign network 130. In this manner, a receipt of new proxy binding update request at the local mobility anchor 113 does not automatically create a new home network prefix for this mobile node, which solves some of the problems with determining when a mobile node is simply connecting to a new access type on the same network or being handed over to a new foreign network.

Figures 3, 4:
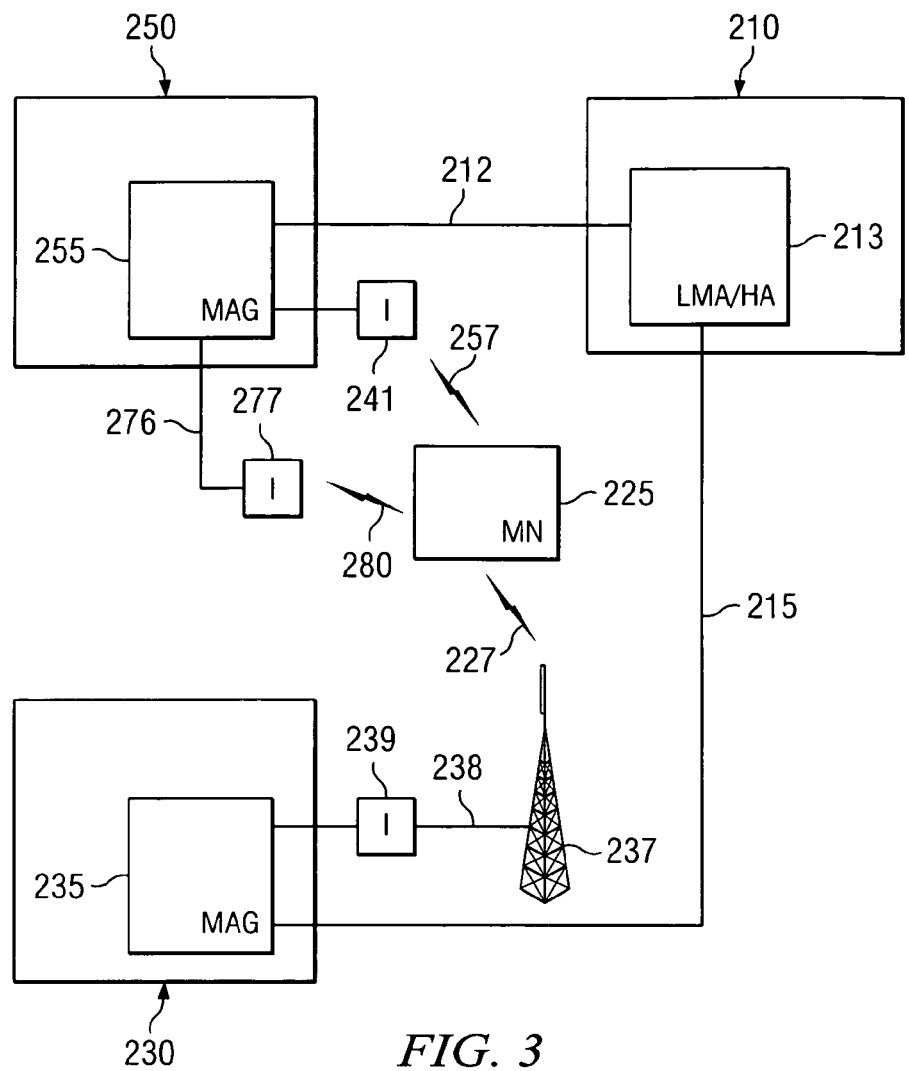
FIG. 3 is a mobile IP-based communication system as used in the present invention using proxy messages that specify access type and handover indicator fields.
FIG. 4 is a binding cache entry table that supports these entries for the system shown in FIG. 3.

In FIG. 3, the overall architecture of the IP-based mobile system is shown with a mobile mode 225, a home network 210 and foreign networks 230 and 250, respectively. As shown in FIG. 3, the home network 210 has a home agent or local mobility anchor 213. The local mobility anchor 213 is coupled to the mobility agent gateway 255 on foreign network 250 by communication link 212, and local mobility anchor 213 is coupled to the mobility agent gateway 235 on foreign network 230 by communication link 215.

The mobility agent gateway 235 is coupled to the mobile node 225 through the radio access system comprised of the base station transceiver 239 coupled to the antenna/transmitter 237 through the communication link 227. The mobility agent gateway 255 is coupled to a second access type, such as WiMax or WiFi, through interface 241 coupled to the mobile node 225 by communication link 257. FIG. 3 also shows a second connection of the same access type as supported by interface 241 for the connection of the mobile node 225 to foreign agent 255 through connection 276 and second access interface 277. This interface is connected to mobile node 225 through communication link 280.

Mobile node 225 is shown electronically coupled to the foreign networks 250 and 230 via the wireless communication link 257 (or 280) and 227, respectively. The mobile node 225, however, can communicate with any transceiver or access network coupled to a foreign network. That is, communications links 227, 280 and 241 are radio transmitted links, but these links can be composed of any connection between two or more nodes on a network or users on networks or administrative domains.

The terms Local Mobility Anchor, home agent, and foreign agent may be as defined in the Mobile IP Protocol (RFC 2002), but these agents are not restricted to a single protocol or system. In fact, the term home agent, as used in this application, can refer to a home mobility manager, home location register, home serving entity, or any other agent at a home network 210 having the responsibility to manage mobility-related functionality for a mobile node 225. Likewise, the term mobility agent gateway, as used in this application, can refer to a foreign agent, serving mobility manager, visited location register, visiting serving entity, or any other agent on a foreign network having the responsibility to manage mobility-related functionality for a mobile node 225.

In the mobile IP communications system shown in FIG. 3, the mobile node 225 is identified by a permanent IP address. While the mobile node 225 is coupled to its home network 210, the mobile node 225 receives information packets like any other fixed node on the home network 210. When mobile, the mobile node 225 can also locate itself on foreign network, such as network 230 or 250. When located on foreign network 230 or 250, the home network 210 sends data communications to the mobile node 225 by "tunneling" the communications to the foreign network 230 or 250.

The mobile node 225 keeps the local mobility anchor 213 informed of its current location, or foreign network association, by registering a care-of address with the local mobility anchor 213. Essentially, the care-of address represents the foreign network where the mobile node 225 is currently located. If the local mobility anchor 213 receives an information packet addressed to the mobile node 225 while the mobile node 225 is located on a foreign network 230, the local mobility anchor 213 will "tunnel" the information packet to foreign network 230 for subsequent transmission to mobile node 225.

The foreign agent 235 participates in informing the local mobility anchor 213 of the mobile node 225 current care-of address. The foreign agent 235 also receives information packets for the mobile node 225 after the information packets have been forwarded to the foreign agent 235 by the local mobility anchor 213. Moreover, the foreign agent 235 serves as a default router for out-going information packets generated by the mobile node 225 while connected to the foreign network 230.

The mobile node 225 participates in informing the local mobility anchor 225 of its current location and requests connections to the associated foreign network. When the mobile node 225 transitions to connecting to foreign network 250, the mobile node 225 obtains appropriate information regarding the address of the foreign network 250 and/or the foreign agent 255 from an agent advertisement.

When first connected to the local mobility anchor 213, mobile node 225 would have created an entry on the binding cache entry table in FIG. 2 that specified the mobile node identification for the first access type. The access type field of information is included in this binding cache entry table in FIG. 2, with the mobile node identification field. FIG. 2 is a binding cache entry table 260 that possesses at least column and row entries for the mobile node identification 265 and the access type 267.

In the system shown on FIG. 3, multiple access types on a single foreign network 250 are supported by multiple interfaces, such as interface 241 and 277. Because the correspondence of the same access type on the binding cache entry table of FIG. 2 may not indicate an inherent handover to a different foreign network from the prior connected foreign network, the proxy binding update request will include a handover indicator for the analysis by the local mobility anchor 213.

The handover indicator would include a new field in the transmission packet that would indicate a handover to the same access type on the same foreign network or a handover to a new foreign network. This information could also be indicated by a flag or other indicator to show the type of handover that will be initiated, e.g. flag "1" equals handover to same access type on same foreign network, flag "0" equals handover to different foreign network. The new field could also indicate if the handover status is unknown, or this is an initial request for a proxy binding update request. Other fields can be maintained on the binding cache entry table, and the transmission packets may be expanded to accommodate the new access type field of information.

The local mobility anchor 213 will check subsequent proxy binding update requests received from the mobile node 225 to determine the handover indicator status. If the handover indicator indicates that the mobile node is being connected to a different foreign network, the local mobility anchor 113 will initiate a protocol for a handover of the mobile node 225 to a new foreign network, such as a handover of mobile node 225 from foreign network 250 to foreign network 230. The local mobility anchor 213 will create a new binding cache entry for the mobile node, and the care-of addressing and home network prefix will be changed to designate the new foreign network as the network where the mobile node 225 can be located, which information will be transmitted to the proper mobility access gateway 235 and the mobile node 225.

If the handover indicator indicates that a handover is being requested to different access type connection for the mobile node 225 on the same foreign network 250, the local mobility anchor 213 will initiate a protocol for designating a home network prefix for the foreign network 250 where the mobile node 225 was previously located without any indication of a handover to a new foreign network. If that is the case, the entry for the mobile node 225 will be modified on the binding cache entry table to indicate that the mobile node 225 is still connected to the first foreign network 250, which information will be transmitted to the proper mobility access gateway 235 and the mobile node 225.

That is, this handover indicator may simply show the new connection for the mobile node 225 is to a new interface for the same access type on the same foreign network 250, as opposed to a handover to a new foreign network. If so, the local mobility anchor 213 will respond to the proxy binding update request with a proxy binding update response having a home network prefix indicator that points to the first foreign network 250. In this manner, a receipt of new proxy binding update request at the local mobility anchor 213 does not automatically create a new home network prefix for this mobile node, which solves some of the problems with determining whether a handover of the mobile node care-of addressing is necessary and whether it is necessary to designate a new foreign network or the same foreign network for this care-of addressing for the mobile node.

As an alternative embodiment that is covered by the scope of the invention, when first connected to the local mobility anchor 213, mobile node 225 would have created an entry on the binding cache entry table in FIG. 4 that specified the mobile node identification for the first access type and interface identification information. The access type field of information is included in this binding cache entry table in FIG. 4, with the mobile node identification field, and the interface identification information in column 269 would have indicated the specific interface information for interface 241 or 277. FIG. 2 is a binding cache entry table 260 that possesses at least column and row entries for the mobile node identification 265, the access type 267, and the interface 269.

In the system shown on FIG. 3, multiple access types on a single foreign network 250 are supported by multiple interfaces, such as interface 241 and 277. Because the correspondence of the same access type on the binding cache entry table of FIG. 4 would include additional information that the local mobility anchor would use to analyze whether the proxy binding update request relates to a handover to a different foreign network 230 from the prior connected foreign network 250 or a handover to a different interface for the same access type on the same foreign network 250.

In addition to the access type information and the handover indicator described above, the proxy binding update request would include a new field in the transmission packet that would identify the interface that will be used to connect the mobile node to the foreign network. The new field could also indicate if the interface identification is unknown. Other fields can be maintained on the binding cache entry table, and the transmission packets may be expanded to accommodate the new access type field of information.

The local mobility anchor 213 will check subsequent proxy binding update requests received from the mobile node 225 to determine the handover indicator status. If the access type, handover indicator and interface identification information indicates that the mobile node is being connected to a different foreign network, the local mobility anchor 113 will initiate a protocol for a handover of the mobile node 225 to a new foreign network, such as a handover of mobile node 225 from foreign network 250 to foreign network 230. The local mobility anchor 213 will create a new binding cache entry for the mobile node, and the care-of addressing and home network prefix will be changed to designate the new foreign network as the network where the mobile node 225 can be located, which information will be transmitted to the proper mobility access gateway 235 and the mobile node 225.

If the access type, handover indicator, and interface identification information indicates that a handover is being requested to different access type connection for the mobile node 225 on the same foreign network 250, the local mobility anchor 213 will initiate a protocol for designating a home network prefix for the foreign network 250 where the mobile node 225 was previously located without any indication of a handover to a new foreign network. If that is the case, the entry for the mobile node 225 will be modified on the binding cache entry table to indicate that the mobile node 225 is still connected to the first foreign network 250, which information will be transmitted to the proper mobility access gateway 235 and the mobile node 225.

That is, the access type, handover indicator, and interface information may simply show the new connection for the mobile node 225 is to a new interface for the same access type on the same foreign network 250, as opposed to a handover to a new foreign network. If so, the local mobility anchor 213 will respond to the proxy binding update request with a proxy binding update response having a home network prefix indicator that points to the first foreign network 250. In this manner, a receipt of new proxy binding update request at the local mobility anchor 213 does not automatically create a new home network prefix for this mobile node, which solves some of the problems with determining whether a handover of the mobile node care-of addressing is necessary and whether it is necessary to designate a new foreign network or the same foreign network for this care-of addressing for the mobile node.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, we claim:

1. A method for registration of a mobile node comprising:
   receiving a registration request message at a local mobility anchor relating to the mobile node connected to a first foreign network, said registration request message including a mobile node identifier, an access type identifier that indicates that communication access type used to connect to the mobile node, a handover indicator that specifies whether the registration request message is associated with a handover to a new access type on the first foreign network or a handover to a second foreign network, and an interface identifier that indicates a specific access interface being used to connect to the mobile node;
   correlating information received in the registration request message against information on a cache entry table associated with the local mobility anchor;
   creating an entry on the cache entry table depending on whether a handover to the second foreign network is detected or a handover to the new access type on the first foreign network is detected; and
   transmitting a registration response from the local mobility anchor with a network prefix depending on whether said handover to the second foreign network is detected or said handover to a new access type on the first foreign network is detected.

2. The method of registration in claim 1 wherein only one access type per interface is supported on the foreign network and wherein the local mobility anchor detects the handover to the second foreign network in accordance with registration request information including the access type indicator.

3. The method of registration in claim 1 wherein multiple interfaces support the same access type on the first foreign network and the local mobility anchor detects the handover to the second foreign network in accordance with registration request information including the access type indicator.

4. The method of registration in claim 1 wherein multiple interfaces support the same access type on the foreign network and the local mobility anchor detects the handover to a new interface on the first foreign network in accordance with registration request information including the interface identification and handover indicator.

5. The method of registration in claim 1 wherein the cache entry table includes information relating to said mobile node connected to the first foreign network, including the mobile node identification information and the access type used to connect the mobile node to the first foreign network.

6. The method of registration in claim 1 wherein the cache entry table includes information relating to said mobile node connected to the first foreign network, including the mobile node identification information and the interface identification for the interface used to connect the mobile node to the first foreign network.

7. The method of registration in claim 1 wherein the cache entry table includes information relating to said mobile node connected to the first foreign network, including the mobile node identification information, the access type, and the interface identification for the interface used to connect the mobile node to the first foreign network.

8. A method for registration of a mobile node comprising:
   receiving a registration request message at a local mobility anchor relating to the mobile node on a first foreign network, said registration request message including a mobile node identifier, an access type identifier that indicates that communication access type used to connect the mobile node, a handover indicator that specifies whether the registration request message is associated with a handover to a new access type on the first foreign network or a handover to a second foreign network, and an interface identifier that indicates a specific access interface being used to connect the mobile node;
   comparing information received in the registration request message against information on a cache entry table associated with the local mobility anchor; and
   transmitting a registration response from the local mobility anchor with a network prefix depending on whether said handover to the second foreign network is detected or said handover to a new access type on the first foreign network is detected.

9. The method of registration in claim 8 wherein only one access type per interface is supported on the foreign network and the local mobility anchor detects the handover to the second foreign network based on the access type indicator.

10. The method of registration in claim 8 wherein multiple interfaces support the same access type on the foreign network and the local mobility anchor detects the handover to the second foreign network based on the access type indicator and other information in the registration request message.

11. The method of registration in claim 8 wherein multiple interfaces support the same access type on the foreign network and the local mobility anchor detects the handover to a new interface on the first foreign network based on the interface identification and handover indicator in the request.

12. The method of registration in claim 8 further comprising the step of:
   creating an entry on the cache entry table depending on whether a handover to the second foreign network is detected or a handover to a new access interface on the first foreign network is detected.

13. The method of registration in claim 12 wherein the cache entry table includes information relating to said mobile node connected to the first foreign network, including the mobile node identification information and the access type used to connect the mobile node to the first foreign network.

14. The method of registration in claim 12 wherein the cache entry table includes information relating to said mobile node connected to the first foreign network, including the mobile node identification information and the interface identification for the interface used to connect the mobile node to the first foreign network.

15. The method of registration in claim 12 wherein the cache entry table includes information relating to said mobile node connected to the first foreign network, including the mobile node identification information, the access type, and the interface identification for the interface used to connect the mobile node to the first foreign network.

16. The method of registration in claim 12 wherein the local mobility anchor detects the handover to the first foreign network based on the access type indicator because only one access type per interface is supported on the first foreign network.

17. A communications network comprising:
- a home network having a local mobility agent coupled to one or more foreign networks, each foreign network having a mobile access gateway that is connected to one or more mobile node;
- the local mobility agent having a cache entry table to maintain information relating to said one or more mobile nodes connected to said foreign network;
- said local mobility agent configured to provide information for mobile node connectivity in response to a registration request message received by the local mobility agent based on a comparison of information received in the request against the information on the cache entry table, said registration request message including a mobile node identifier, an access type identifier that indicates that communication access type used to connect the mobile node to at least one of the one or more foreign networks, a handover indicator that specifies whether the registration request message is associated with a handover to a new access type on a first foreign network to which one of the one or more mobile nodes is connected or a handover to a new foreign network, and an interface identifier that indicates a specific access interface being used to connect the mobile node to the one of the one or more foreign networks.

18. The communications network in claim 17 wherein only one access type per interface is supported on the one or more foreign networks and the local mobility anchor detects a handover to the new foreign network based on the access type indicator.

19. The communications network in claim 17 wherein multiple interfaces support the same access type on the one or more foreign networks and the local mobility anchor detects a handover to the new foreign network based on the access type indicator and other information in the registration request message.

20. The communications network in claim 17 wherein multiple interfaces support the same access type on the one or more foreign networks and the local mobility anchor detects a handover to a new interface on the first foreign network based on the interface identification and handover indicator in the request.

* * * * *